United States Patent [19]
Knefel

[11] Patent Number: 5,293,383
[45] Date of Patent: Mar. 8, 1994

[54] METHOD AND APPARATUS FOR TESTING A SMALLEST ADDRESSABLE UNIT OF A STORAGE MEDIUM OF A RAM MEMORY SYSTEM FOR DETERMINATION OF A NUMBER OF BIT ERRORS LYING ABOVE A DEFINED ORDER

[75] Inventor: Hans-Werner Knefel, Martinsried, Fed. Rep. of Germany

[73] Assignee: Siemens Aktiengesellschaft, Munich, Fed. Rep. of Germany

[21] Appl. No.: 684,836

[22] Filed: Apr. 15, 1991

[30] Foreign Application Priority Data

Apr. 27, 1990 [EP] European Pat. Off. ......... 90108057.2

[51] Int. Cl.$^5$ ............ G06F 11/00; G06F 11/22; G11C 29/00
[52] U.S. Cl. ............................ 371/3; 371/21.3; 371/40.1
[58] Field of Search ............ 371/21.1, 21.2, 21.3, 371/21.5, 21.6, 3

[56] References Cited

U.S. PATENT DOCUMENTS 4,782,487 11/1988 Smelser ........................... 371/21.6
4,980,888 12/1990 Bruce et al. ..................... 371/21.1

Primary Examiner—Stephen M. Baker
Attorney, Agent, or Firm—Hill, Steadman & Simpson

[57] ABSTRACT

Method and apparatus for testing a smallest addressable unit of a storage medium of a RAM memory system for determination of a number of bit errors lying above a defined order. The test of a smallest addressable unit of a storage medium occurs completely and quickly in an optimum manner. To this end, a test procedure based on parity formation using at least first and second test patterns is used, wherein the effect of a bit error for a test pattern is transferred into the next test pattern. A combination of bit errors when checking this test pattern is thus recognized, derived from the addition of bit errors that appeared separately in the first and second test patterns.

15 Claims, 7 Drawing Sheets

FIG 1
(PRIOR ART)

| K-Bits |  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| CX | (XOR) | X |  |  |  | X |  | X | X | X | X |  | X |  |  | X |  |
| C0 | (XOR) | X | X | X |  | X |  | X |  | X |  | X |  | X |  |  |  |
| C1 |  |  | X |  | X | X |  |  | X |  | X | X |  |  | X |  | X |
| C2 |  | X | X |  |  |  | X | X | X |  |  |  | X | X | X |  |  |
| C4 | (XOR) |  |  | X | X | X | X | X | X |  |  |  |  |  |  | X | X |
| C8 | (XOR) |  |  |  |  |  |  |  |  | X | X | X | X | X | X | X | X |
| C16 | (XOR) | X | X | X | X | X | X | X | X |  |  |  |  |  |  |  |  |

| K-Bits |  | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|
| CX | (XOR) |  | X | X |  | X |  |  |  |  | X |  |  | X | X |  | X |
| C0 | (XOR) | X | X | X |  | X |  | X |  | X |  | X |  | X |  |  |  |
| C1 |  |  | X |  | X | X |  |  | X |  | X | X |  |  | X |  | X |
| C2 |  | X | X |  |  |  | X | X | X |  |  |  | X | X | X |  |  |
| C4 | (XOR) |  |  | X | X | X | X | X | X |  |  |  |  |  |  | X | X |
| C8 | (XOR) |  |  |  |  |  |  |  |  | X | X | X | X | X | X | X | X |
| C16 | (XOR) |  |  |  |  |  |  |  |  | X | X | X | X | X | X | X | X |

| SMe | SMa | |
|---|---|---|
| | SMa/1 | SMa/2 |
| 1 0 0 0 0 0 0 | 1 0 0 1 1 0 1 | 0 1 1 0 0 1 0 |
| 0 1 0 0 0 0 0 | 0 1 0 1 1 1 0 | 1 0 1 0 0 0 1 |
| 0 0 1 0 0 0 0 | 0 0 1 1 1 1 0 | 1 1 0 0 0 0 1 |
| 0 0 0 1 0 0 0 | 0 1 0 1 1 1 0 | 1 0 1 0 0 0 1 |
| 0 0 0 0 1 0 0 | 1 0 0 0 1 1 1 | 0 1 1 1 0 0 0 |
| 0 0 0 0 0 1 0 | 0 0 1 1 1 1 0 | 1 1 0 0 0 0 1 |
| 0 0 0 0 0 0 1 | 1 0 0 1 1 0 1 | 0 1 1 0 0 1 0 |
| | | |
| 0 1 1 0 0 1 0 | 1 1 1 0 0 1 1 | 1 1 1 0 0 1 1 |
| 1 0 1 0 0 0 1 | 1 1 1 1 0 0 1 | 1 1 1 1 0 0 1 |
| 1 1 0 0 0 0 1 | 1 1 1 0 0 1 1 | 1 1 1 0 0 1 1 |
| 0 1 1 1 0 0 0 | 0 1 1 1 1 0 1 | 0 1 1 1 1 0 1 |

| Bsp.1 | DM | KM | SMe |
|---|---|---|---|
| 1.TM wr | 0 0 0 0 0 0 0 0 | 0 0 0 1 1 0 0 | |
| 1.TM rd | 0 0 0 0 0 0 0 0 | 0 0 0 1 1 0 0 | |
| | | 0 0 0 1 1 0 0 | 0 0 0 0 0 0 0 |
| 2.TM wr | F F F F F F F F | 1 1 1 0 0 1 1 | |
| 2.TM rd | F F F F F F F F | 1 1 1 0 0 1 1 | |
| | | 1 1 1 0 0 1 1 | 0 0 0 0 0 0 0 |
| 3.TM wr | F F F F F F F F | 0 0 0 1 1 0 0 | |
| 3.TM rd | F F F F F F F F | 0 0 0 1 1 0 0 | |
| | | 0 0 0 1 1 0 0 | 0 0 0 0 0 0 0 |

FIG 8

| Bsp.2 | DM | KM | SMe |
|---|---|---|---|
| 1.TM wr | 00000000 | 0001100 | |
| 1.TM rd | 0001<u>1</u>0000 | 0001100 | |
| | | 0000010 | 0001110 |
| 2.TM wr | FFFFFFFF | 1111101 | |
| 2.TM rd | FFFFFFFF | 1111101 | |
| | | 1110011 | 0001110 |
| 3.TM wr | FFFFFFFF | 0000010 | |
| 3.TM rd | FFFFFFFF | 0000010 | |
| | | 0001100 | 0001110 |

FIG 9

| Bsp.3 | DM | KM | SMe |
|---|---|---|---|
| 1.TM wr | 00000000 | 0001100 | |
| 1.TM rd | 00000000 | 0001100 | |
| | | 0001100 | 0000000 |
| 2.TM wr | FFFFFFFF | 1110011 | |
| 2.TM rd | FFF<u>0</u>FFFF | 1110011 | |
| | | 1111000 | 0001011 |
| 3.TM wr | FFFFFFFF | 0000111 | |
| 3.TM rd | FFF<u>0</u>FFFF | 0000111 | |
| | | 0000111 | 0000000 |

FIG 10

| Bsp.4 | DM | KM | SMe |
|---|---|---|---|
| 1.TM wr | 0 0 0 0 0 0 0 0 | 0 0 0 1 1 0 0 | |
| 1.TM rd | 0 0 0 <u>1</u> 0 0 0 0 | 0 0 0 1 1 0 0 | |
| | | 0 0 0 0 0 1 0 | 0 0 0 1 1 1 0 |
| 2.TM wr | F F F F F F F F | 1 1 1 1 1 0 1 | |
| 2.TM rd | F F F F F F F F | 1 1 1 1 1 0 1 | |
| | | 1 1 1 0 0 1 1 | 0 0 0 1 1 1 0 |
| 3.TM wr | F F F F F F F F | 0 0 0 0 0 1 0 | |
| 3.TM rd | F F F F F F F F | 0 0 0 0 <u>1</u> 1 0 | |
| | | 0 0 0 1 1 0 0 | 0 0 0 1 0 1 0 |

FIG 11

| Bsp.5 | DM | KM | SMe |
|---|---|---|---|
| 1.TM wr | 0 0 0 0 0 0 0 0 | 0 0 0 1 1 0 0 | |
| 1.TM rd | 0 0 0 0 0 0 0 0 | <u>1</u> 0 0 1 1 0 0 | |
| | | 0 0 0 1 1 0 0 | 1 0 0 0 0 0 0 |
| 2.TM wr | F F F F F F F F | 1 0 0 0 0 0 1 | |
| 2.TM rd | F F F F F F F F | 1 0 0 0 0 0 1 | |
| | | 1 1 1 0 0 1 1 | 0 1 1 0 0 1 0 |
| 3.TM wr | F F F F F F F F | 1 1 1 1 1 1 1 | |
| 3.TM rd | F F F F F F F F | 1 1 1 1 1 1 1 | |
| | | 0 0 0 1 1 0 0 | 1 1 1 0 0 1 1 |

FIG 12

| Bsp.6 | DM | KM | SMe |
|---|---|---|---|
| 1.TM wr | 00000000 | 0001100 | |
| 1.TM rd | 00000000 | 0001100 | |
| 2.TM wr | FFFFFFFF | 0001100<br>1110011 | 0000000 |
| 2.TM rd | FFFFFFFF | 1010011 | |
| 3.TM wr | FFFFFFFF | 1110011<br>1011101 | 0100000 |
| 3.TM rd | FFFFFFFF | 1011101<br>0001100 | 1010001 |

FIG 13

| Bsp.7 | DM | KM | SMe |
|---|---|---|---|
| 1.TM wr | 00000000 | 0001100 | |
| 1.TM rd | 00010000 | 0001100 | |
| 2.TM wr | FFFFFFFF | 0000010<br>1111101 | 0001110 |
| 2.TM rd | FFFFFFFF | 1111001 | |
| 3.TM wr | FFFFFFFF | 1110011<br>0000110 | 0001010 |
| 3.TM rd | FFFFFFFF | 0000010<br>0001100 | 0001110 |

METHOD AND APPARATUS FOR TESTING A SMALLEST ADDRESSABLE UNIT OF A STORAGE MEDIUM OF A RAM MEMORY SYSTEM FOR DETERMINATION OF A NUMBER OF BIT ERRORS LYING ABOVE A DEFINED ORDER

BACKGROUND OF THE INVENTION

The present invention relates in general to a method and apparatus for testing for bit errors in storage mediums, and in particular, in a RAM memory system.

A standard method, referred to as EDC monitoring, for recognizing faults of a storage medium of a RAM memory system during a normal operation is based on additionally co-storing a defined plurality of redundant bits under the address of the data word to be stored. These bits are referred to as check bits and are derived from the data word or from parts of the data word using a defined algebraic rule. Upon read-out of the stored word, check bits are again formed according to the defined algebraic rule and are compared to the read-out check bits for all bit locations. When there is equality for all check bits, it is assumed that the data word that was read out is error-free. For an inequality the type of error is identified from the pattern of the non-coincidence, referred to as a syndrome pattern. Those bit locations of the check bits that do not coincide are called syndromes. Certain syndrome patterns are decoded and the falsified bit position or falsified bit positions in the data word are identified as warranted and corrected by inverters.

The second formation of the check bits, the comparison, the decoding of the syndromes, as well as the correction and potential error notification are normally carried out in the prior art using specific LSI modules, that is EDC monitors.

FIG. 1 shows a specific algebraic rule, defining a modified Hamming code, with which the check bits are formed in a specific monitor module, for example a Am2960. As depicted in FIG. 1, data words are assumed that have 32 data bits. Seven check bits CX, C0, C1, C2, C4, C8 and C16 are allocated to these data bits, each monitor bit being respectively formed by parity formation from defined bit positions of a data word. The bit positions that are utilized for the parity formation of the respective check bit are marked with an X in FIG. 1. The type of parity that forms the foundation for the parity formation can be derived from FIG. 1. Thus, for example, the check bit CX is formed such that its binary value supplements the sum of the binary values of the bits 0, 4, 6, 7, 8, 9, 11, 14, 17, 18, 19, 21, 26, 28, 29 and 31 of a data word to an even parity. The check bit C2, by contrast, augments the bits 0, 1, 5, 6, 7, 11, 12, 13, 16, 17, 21, 22, 23, 27, 28 and 29 to an odd parity, etc. As a result of this rule, for example, the check bits 0001100 are allocated to a data word FFFFFFFF.

It is known to also utilize the above-described EDC monitoring for testing the storage medium for multiple bit errors.

The principle of such a test procedure is that the old test pattern previously written into the storage medium is read out using a read-write cycle, a check is carried out with reference to the check bits that are also read out and the next test pattern is subsequently written in. In order for addressing errors to produce a display of bit errors, a test cycle is respectively executed over a plurality of addresses of the storage medium before the method is continued with the next test cycle.

The comparison of the read-out check bits to newly formed check bits via the read-out data occurs on the basis of XOR formation. The result of this operation is the syndrome pattern that contains a 1 at the unequal bit positions and, as mentioned, corresponds to the type of error. When, for example, the specific algebraic rule depicted in FIG. 1 is used for the allocation of the check bits, then a syndrome pattern with an odd number of ones arises for the occurrence of a single bit error and a syndrome pattern with an even number of ones arises for the occurrence of a double bit error. It is assumed for the following comments regarding the prior art that, due to the negligibly low probability of errors of a higher order, multiple bit errors always appear as double bit errors. This assumption, for example, is reliably guaranteed when the storage medium is constructed with RAM modules having a word width of one bit and, thus, the simultaneous outage of two RAM modules would at most produce a double bit error.

The number of possible double bit errors derives from the plurality of selection possibilities of two bits from N bits, where N is the plurality of bits in a memory word including the check bits. There are in turn four possibilities of the occurrence of double bit errors for each of these possibilities:

1. First bit falsified to 0—Second bit falsified to 0
2. First bit falsified to 0—Second bit falsified to 1
3. First bit falsified to 1—Second bit falsified to 0
4. First bit falsified to 1—Second bit falsified to 1

The number of overall double bit error possibilities thus amounts to $N*(N-1)*2$.

Two known testing procedures that are based on this testing principle shall be set forth below.

In the testing procedure, a first test pattern is first written in via all addresses of the storage medium, this test pattern is later read out in turn in a second method step and is monitored for single bit errors or double bit errors using EDC monitoring. Given the appearance of a single bit error, the affected address is tested with a second test pattern that has its data bit part completely inverted as compared to the first test pattern. When a single bit error occurs again, the double bit error is considered detected. When no further single bit error occurs, the same procedure is repeated with a third test pattern that has its check bits inverted.

The described, first testing procedure can be implemented in two versions. In the first version the appertaining address is stored given the occurrence of a single error in order to draw conclusions about the presence of a double bit error given the appearance of a further single error in a following test step. The disadvantage of this version of the first testing procedure is that it requires a corresponding amount of memory locations for the occurrence of many single bit errors.

In the second version the test cycle is interrupted given the appearance of a single bit error and the complete method is implemented at this address. Although the storing of the appertaining address is thus saved in comparison to the first version, time-consuming interruptions are necessary. This method is thus extremely time-consuming given the appearance of many single bit errors (for example, when the error affects an entire memory module).

In the second testing procedure the test is constructed such that every combination of two single bit errors appears as a double bit error in at least one test pattern TM. An example for 8 bits follows:
1. TM 00000000
2. TM 11111111
3. TM 00001111
4. TM 11110000
5. TM 00110011
6. TM 11001100
7. TM 01010101
8. TM 10101010

The test patterns TM are determined on the basis of continued, meander-like subdivision. Their number given N bits is (ld N+1)*2, whereby ld is the logarithm for base 2. This minimum number of test patterns is further incremented when it is taken into consideration that the check bits must also be involved in the test and are dependent on the data bits. The second testing procedure thus requires a relatively large number of test patterns or, respectively, test runs.

SUMMARY OF THE INVENTION

The object of the present invention is to provide a method with which the smallest addressable units of the storage medium of a RAM memory system are tested as completely as possible for determination of a number of bit errors lying above a defined order, the test time being optimally short.

The inventive transfer of the effects of bit errors onto the check pattern of the following test pattern enables the testing procedure to be implemented without interrupting the permanently prescribed sequence as well as without occupying storage space. The required testing time is thereby considerably shortened.

In general terms the method has the following steps:
(a) a first test pattern is written into the smallest addressable unit of the storage medium, the test pattern being composed of a data pattern and of a monitoring pattern, the monitoring pattern being formed from the data pattern according to a defined algebraic rule;
(b) the first test pattern is later read out in turn, and a monitoring pattern is again formed from the read-out data pattern according to the same algebraic rule;
(c) the monitoring pattern formed anew is compared to the read-out monitoring pattern, so that an occurrence of bit errors lying below a defined order and lying above a defined order are recognized; and
(d) method steps (a) through (c) are repeated with a second test pattern that, given prior absences of a bit error, is completely inverted by comparison to the first test pattern or, respectively, given the prior occurrence of a number of bit errors lying below a defined order, the inversion of the monitoring pattern is modified such that the effect of the bit error(s) of this number continues to remain for the repeated implementation of method steps (a) through (c) and a combination of bit errors is thus recognized in method step (c) that is derived by means of an addition of bit errors that separately occurred in the first and second test patterns.

In a preferred embodiment of the present invention the same predetermined test pattern is used as a first test pattern for every smallest addressable unit of the storage medium. This embodiment is extremely simple since it requires no additional hardware.

In a further preferred embodiment of the present invention the memory word situated in the respective, smallest addressable unit at the beginning of the test is used as a first test pattern, method step (a) for the first test pattern thus being already considered executed. Compared to the afore-mentioned embodiment, this embodiment has the advantage that the data stored during normal operation of the storage medium are not lost due to the testing procedure when appropriate hardware provides a data pattern for the third test pattern that is inverted after the conclusion of the test. Thus, the original memory word can again be written into the tested, smallest addressable unit.

A further preferred embodiment of the present invention has the advantage of enhancing the quality of the test in that the check bit positions potentially modified in the second test pattern are also tested in both bit polarities on the basis of a third test pattern.

A further preferred embodiment of the present invention has the advantage of enhancing the quality of the method across a plurality of tests, wherein the data pattern of the first test pattern of a test can be generated, for example, by a random generator.

A further preferred embodiment of the present invention has the advantage of realizing the method of the present invention in an especially simple manner by transferring the effect of a bit error onto the test pattern that follows this bit error.

A further preferred embodiment of the present invention has the advantage of guaranteeing the inventive transfer of bit errors for bit errors also occurring in the monitoring pattern.

A circuit arrangement for the implementation of the method of the present invention has the advantage that it can be used for EDC monitoring during normal operation of the RAM memory system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a chart depicting a specific algebraic rule, that defines a modified Hamming code;

FIG. 8 is a chart depicting an example of a specific test execution with a single error in the data pattern of the second test pattern;

FIG. 9 is a chart depicting an example of a specific test execution with a single error at bit position 17 in the data pattern of the first test pattern;

FIG. 10 is a chart depicting an example of a specific test execution with a single error in the data pattern of the first test pattern and a single error in the monitoring pattern of the third test pattern;

FIG. 11 is a chart depicting an example of a specific test execution for a single error in the monitoring pattern of the first test pattern;

FIG. 12 is a chart depicting an example of a specific test execution with a single error in the monitoring pattern of the second test pattern; and FIG. 13 a chart depicting an example of a specific test execution for a single error in the data pattern of the first test pattern, as well as, for a single error in the monitoring pattern of the second test pattern.

DESCRIPTION OF THE PREFERRED EMBODIMENT

Figure 2:
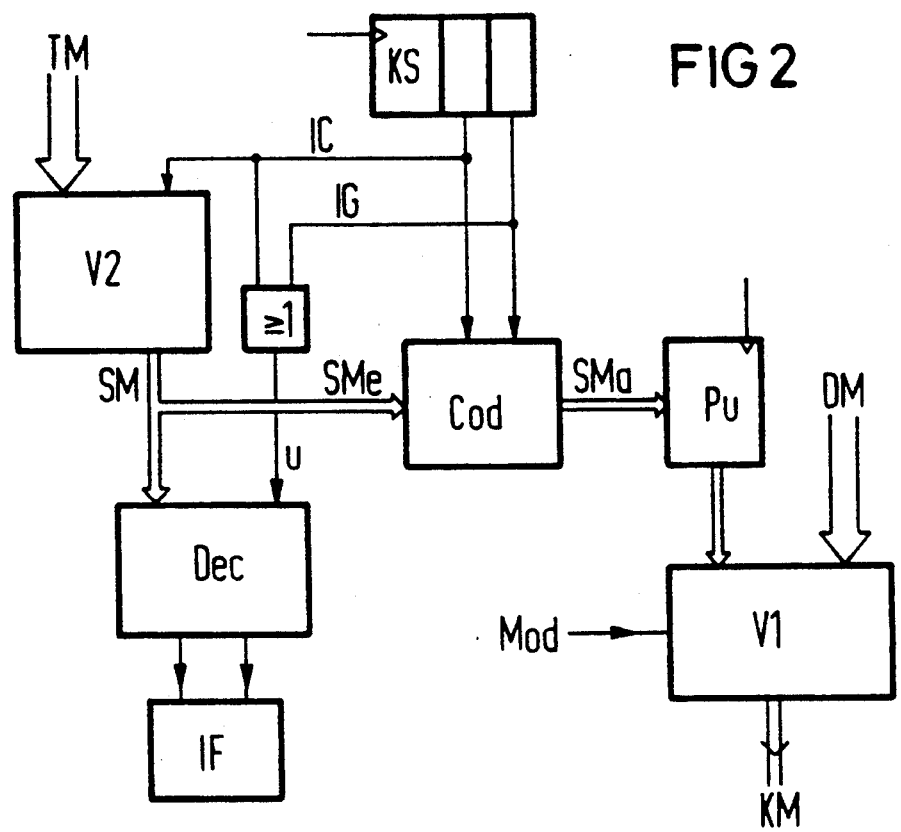
FIG. 2 is a circuit arrangement for the implementation of the method of the present invention.

The present invention has general applicability, but is most advantageously utilized in a circuit as generally depicted in FIG. 2.

The method of the present invention covers a maximum of four test cycles, these being read-write cycles. That is, a test pattern is read out at every test cycle, the test pattern that is read out is checked for bit errors, and, subsequently, a new test pattern is written in. Every test pattern is composed of a data pattern and of a monitoring pattern, the monitoring pattern being formed before the write-in of the test pattern. The monitoring pattern is formed by parity formation from the data pattern according to the code depicted in FIG. 1 and taking the result of the previous test cycle into consideration.

In a version of the test wherein the same first test pattern is used for every smallest addressable unit, the first test cycle begins without taking the read-out memory word into consideration, beginning with the write-in of this first test pattern. The data pattern of the first test pattern is basically arbitrary, as shall be set forth later, whereas the monitoring pattern is defined by the selection of the data pattern, according to the code depicted in FIG. 1. In order to also be able to recognize addressing errors with the method of the present invention, a test cycle with the respective test pattern is implemented over a plurality of addresses of the storage medium.

In the following second test cycle, the first test pattern written in the first cycle is read out, is checked for bit errors, and a second test pattern that is usually completely inverted in comparison to the first test pattern is formed and written in. This procedure is again repeated at a plurality of addresses of the storage medium.

In a version of the test wherein the memory word situated in the respective, smallest addressable unit at the beginning of the test is used as the first test pattern, this second test cycle represents the beginning of the testing procedure.

More specifically, the execution occurs in such a way that a monitoring pattern is again formed from the read-out data pattern of the first test pattern and the monitoring pattern that is again formed is compared to the read-out monitoring pattern. The comparison is preferably executed by XOR formation of the monitoring bits of the newly formed monitoring pattern with the monitoring bits of the read-out monitoring pattern. The result of this operation is the syndrome pattern that contains a 1 at the unequal bit positions.

Whether a number of bit errors has occurred and whether the number lies above a defined order is recognized by reference to the syndrome pattern. Preferably, the defined order will be identical to the order of bit errors maximally correctable by the EDC monitoring during normal operation since the proper operation of the RAM memory system is only disrupted for bit errors that can no longer be corrected. In order to avoid the occurrence of a number of bit errors lying above the defined order, the storage medium is constructed of RAM modules that preferably have a word width that does not lie above the defined order.

Bit errors in numbers that lie below or above the defined order are referred to below as single or multiple errors, respectively.

The bit errors recognized by reference to the syndrome pattern are signalled to an interface as single or multiple errors and this interface sorts these according to two types of errors and intermediately stores them. A controller can access this interface after every test cycle and is thus informed of the presence of a multiple error.

A critical feature of the method of the present invention is that the syndrome pattern, in addition to being utilized for the recognition of multiple errors, is also utilized for the formation of the monitoring pattern that is required for the next test pattern to be written in.

Occurring by complete inversion of the first test pattern, the formation of the second test pattern thus occurs only for non-recognition of a bit error. However, the monitoring bits are additionally modified in the case of a single error such that this bit error continues to remain effected under this address upon read-out of the second test pattern in the following test cycle. That is, the same syndrome pattern occurs again and a single error is thus signaled again in case no further bit error occurs with this test pattern. In case a further bit error occurs with this read-out, then, together with the previous modification of the monitoring bits, this leads to the signalling of a combination of bit errors that results through the addition of the bit errors occurring in the first and second test patterns. Two single errors in a multiple error therefore do not occur for a first time in the same test pattern.

An especially simple realization of this concept of the present invention can be achieved in that the modification of the monitoring pattern is implemented in such a way that it is exactly those monitoring bits whose allocated syndrome bits lie at logical 1 that are inverted. When no new bit error occurs, the same syndrome pattern occurs upon readout and checking of the test pattern modified in this manner precisely when the bit error causing the modification does not occur again in the modified test pattern. Preventing the renewed occurrence of the original bit error, however, is achieved precisely by the bit polarities changing from the first to the second test pattern.

In the case of a single error upon read-out of the first test pattern, no complete inversion of the second test pattern can occur as a result of the inventive modification of the monitoring pattern of the second test pattern. For this reason, the modified monitoring positions are not tested in both bit polarities in this case given a test having only two test patterns. When it is desirable to increase the completeness of the testing procedure, then it is possible to use a third test pattern that is inverted in comparison to the second test pattern at least at those monitoring bit positions that are affected by the modification in the second test pattern.

So that the method of the present invention can also be used given the appearance of single errors in the monitoring pattern, the syndrome pattern occurring in this case must be recoded in such fashion that, given the modification of the monitoring pattern of the following test pattern, it operates in the same inventive manner as the syndrome pattern for a bit error in the data pattern. This can be achieved in that the syndrome pattern for single errors in the monitoring pattern is recoded into a syndrome pattern for a defined bit error in the data pattern and is only subsequently utilized for the modification of the monitoring pattern. Further measures that are just as significant for the implementation of the specific method of the present invention are set forth below in the description of FIGS. 2–13.

FIG. 2 depicts a circuit arrangement for the implementation of the present invention. This circuit arrangement essentially involves the same circuit arrangement that also implements the afore-mentioned EDC monitoring. However, in the test procedure of the present invention, the circuit arrangement operates in a modified operating mode and is augmented by a syndrome recoder Cod for recoding specific syndrome patterns. The circuit arrangement processes a data pattern DM that 32 bits wide and a monitoring pattern KM that is 7 bits wide. This provides, during normal operation, for the correction of single bit errors, that is, bit errors of the order 1, as well as providing the recognition of bit errors of the order 2. The circuit arrangement during the inventive operation serves the purpose of testing for bit errors above order 1.

A first means V1 generates the monitoring pattern that is written into the smallest addressable unit of the storage medium as test pattern TM together with the data pattern. Generating the monitoring pattern fundamentally occurs according to the code of FIG. 1 from the data pattern. Beginning with the second test cycle, however, a syndrome pattern SM is additionally involved via a syndrome buffer Pu for modifying the monitoring pattern. The involvement of the syndrome pattern SM in the formation of the monitoring pattern is controlled via a control signal Mod. The provision of the data pattern DM is assumed in FIG. 2. Since at most three test patterns are required for the test of the present invention and since the data pattern of the third test pattern preferably coincides with that of the second test pattern, only two different data patterns, that are completely inverted relative to one another, are required for the test of a smallest addressable unit. Two different advantageous methods are available for providing this data pattern. In a simple manner, one method is the storing of the two necessary data patterns and calling them in for the test. This, however, necessarily means that all smallest addressable units must be tested with the same two data patterns and the data stored in the storage medium are therefore either lost due to the test or must be saved in some other storage medium before the test.

The other medium is the providing of an additional means for the inversion of the data pattern. This results in the data word stored in the storage medium being used as a data pattern of the first test pattern. The data pattern is then inverted for the later test patterns by the additional means and is capable of being written again into the tested, smallest addressable unit after the test by another, final inversion. Despite the test, the data stored in the storage medium are preserved.

A second means V2 accepts the read-out test pattern TM, again generates a monitoring pattern from the data pattern according to the code of FIG. 1 and subsequently generates a syndrome pattern SM by XOR formation over all bit positions of the new monitoring pattern with the old monitoring pattern. On the basis of the syndrome pattern, a syndrome decoder Dec discriminates between single and multiple errors and signals the recognition of a single or multiple error to an interface IF that is interrogated by a controller after every test cycle. The operating mode of the syndrome decoder Dec for the test procedure of the present invention is set by a control signal U and upon reception of the control signal U, the signalling of specific multiple errors that would be triggered in the inventive transmission of a single error that appeared in the monitoring pattern is suppressed. The formation of the control signal U occurs via an OR element from a control signal IC and from a control signal IG, these two latter control signals are generated by a trigger circuit KS that is in turn set by a higher-ranking controller. The two control signals also serve the purpose of defining the operating mode of the syndrome recoder Cod that recodes the syndrome pattern in a manner yet to be set forth and supplies the recoded syndrome pattern to the first means V1 via the afore-mentioned syndrome buffer Pu. The control signal IC also acts on the second means V2, as explained in greater detail below.

Figure 3:
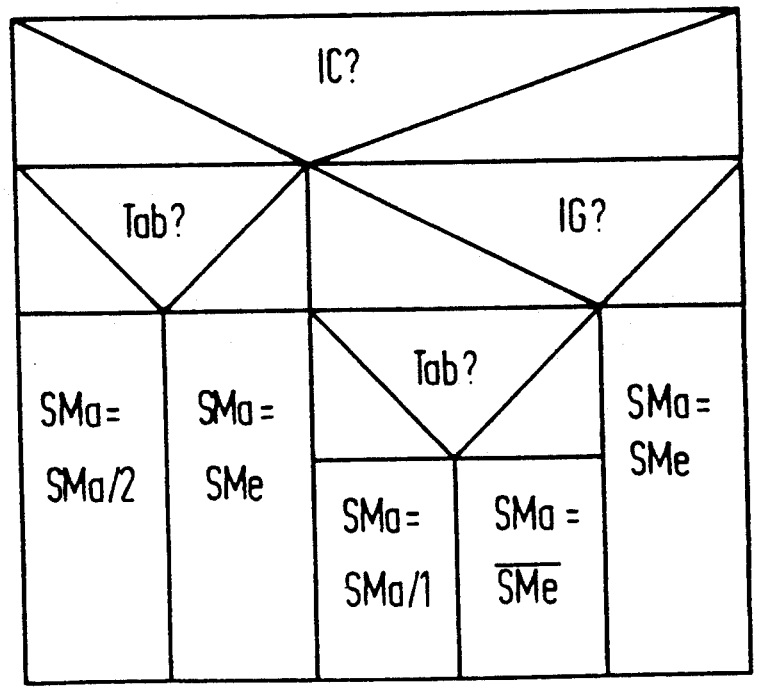
FIG. 3 is a structogram for illustrating the recoding of a syndrome pattern.

FIG. 3 shows a structogram for illustrating t he recoding of the syndrome pattern by the syndrome recoder Cod. When, for example, the control signal IC is a "1" (third test cycle) and when an input syndrome pattern SMe, received at the input of the syndrome recoder Cod, involves one of the patterns in a table Tab depicted in FIG. 4, then the syndrome recoder Cod generates an output syndrome pattern SMa that is derived from the column SMa/2 of the FIG. 4 table. Otherwise, the syndrome recoder Cod allows the syndrome pattern SMe to pass without modifying it, i.e. the output syndrome pattern SMa is identical to the input syndrome pattern SMe. When, conversely, it is not the control signal IC but the control signal IG that is a "1" (second and fourth test cycles) and when the input syndrome pattern, received at the input of the syndrome recoder Cod is one of the patterns in the FIG. 4 table tab, then the syndrome recoder Cod generates an output syndrome pattern SMa that is derived from the column SMa/1 of the FIG. 4 table. Otherwise, the syndrome recoder Cod inverts the input syndrome pattern SMe. This inversion is utilized for generating an inverse monitoring pattern as required for the second test pattern.

Figures 4, 5:
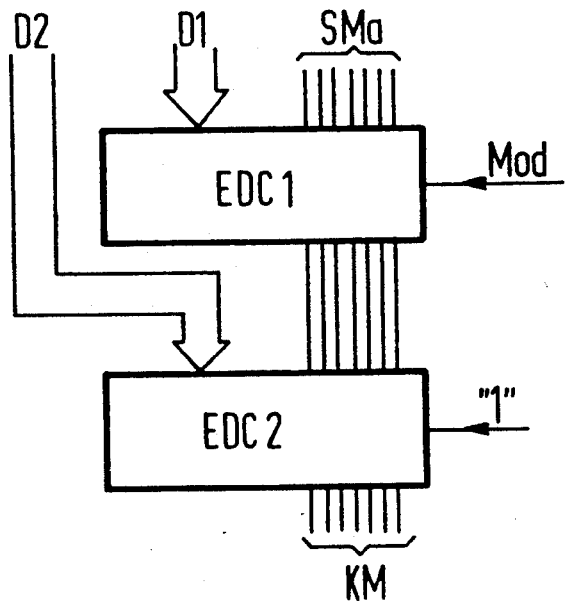
FIG. 4 is a table for recoding specific input syndrome patterns.
FIG. 5 is a block diagram depicting a first means V1 for generating the monitoring pattern.

FIG. 4 shows the afore-mentioned table Tab for recoding specific input syndrome patterns SMe. One group of specific input syndrome patterns is formed by the syndrome patterns of single errors in the monitoring pattern that, for the inventive transfer of a single errors, are recoded into syndrome patterns of defined, odd-numbered multiple errors. The other groups are provided because the monitoring bits must also be checked in both polarities even though they must simultaneously guarantee the transfer of bit errors. This situation shall be set forth in yet greater detail below with reference to an example.

FIG. 5 shows the first means V1 for generating the respective monitoring pattern from the data pattern. It is composed of two monitor modules EDC1 and EDC2 each of which forms seven monitoring bits from respectively 16 data bits according to the code of FIG. 1 and, after EXOR formation with the remaining inputs, forwards these to the outputs of the module, representing the monitoring pattern KM to be written in. The bits 0 through 15 of the data pattern to be written in are received at the data input D1 of the first module EDC1 and the output syndrome pattern SMa of the syndrome recoder Cod is received at the remaining inputs thereof. The bits 16 through 31 of the data pattern to be written in are received at the data input D2 of the second module EDC2 and the outputs of the first module EDC1 are connected to the remaining inputs thereof.

The control signal Mod received by the first module EDC1 defines whether the recoded syndrome pattern, that is, the output syndrome pattern SMa is involved or not in the formation of the monitoring bits. This involvement occurs after the formation of the second test pattern. The monitoring pattern generated by the first means V1 is thus provided at the outputs of the second module EDC2, this monitoring pattern, together with the data pattern from which it was formed, being written into the smallest addressable unit as test pattern TM.

The necessary inversion of the monitoring pattern for the second test pattern that is fundamentally inverted in comparison to the first test pattern is effected by the co-involvement of the output syndrome pattern SMa. In this case, the syndrome recoder Cod serves not only the purpose of recoding specific syndrome pattern for transferring specific bit errors into the following syndrome pattern but simultaneously effects the inversion of the monitoring pattern for the second test pattern. According to the structogram in FIG. 3, the control signal IG must be a "1". The inversion of the monitoring pattern for the second test pattern is necessary because the algebraic rule of FIG. 1 specifically selected for the exemplary embodiment allocates the same monitoring pattern to two data patterns that are inverse compared to one another.

Together with the data pattern, the monitoring pattern of the second test pattern generated in this manner is written into the smallest addressable unit and is again read out in the following third test cycle. In the second means V2, a monitoring pattern is then again formed from the data pattern of the read-out second test pattern and this monitoring pattern is compared to the monitoring pattern that is read out. Before this comparison, however, the monitoring pattern that is formed anew must be additionally inverted (or, respectively, the read-out monitoring pattern must be re-inverted). This measure is effected in the second means V2 when the control signal IC is received.

Figures 6, 7:
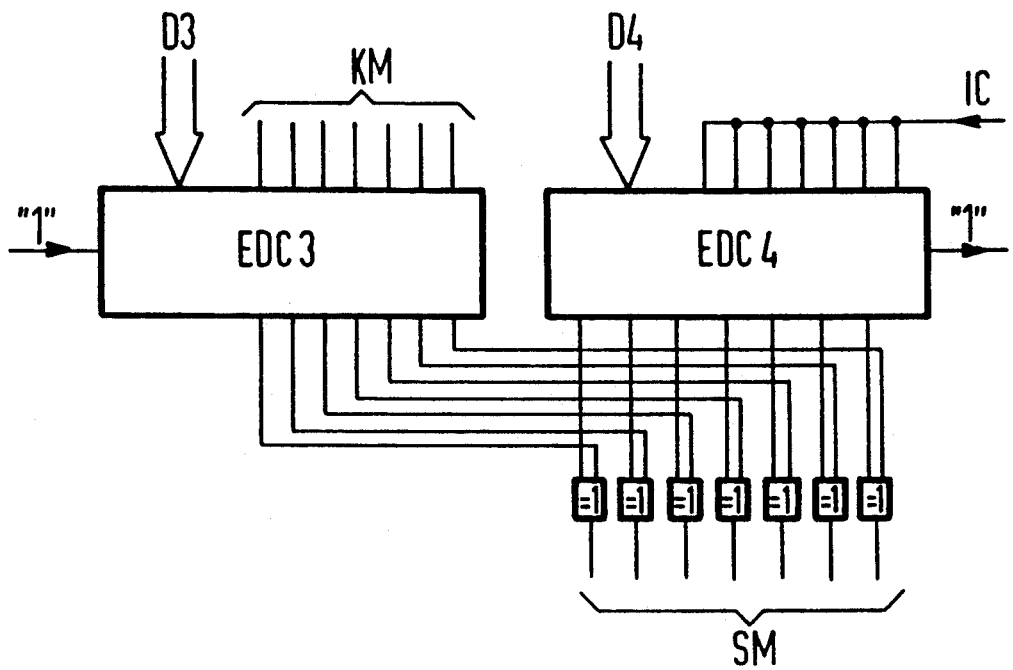
FIG. 6 is a block diagram depicting a second means V2 for checking the test pattern that is respectively read out.
FIG. 7 is a chart depicting an example of a specific test execution of a test sequence for a specific, smallest addressable unit where no bit error was found.

FIG. 6 shows the structure of the second means V2 that contains a third and a fourth monitor module EDC3 and EDC4, whose functioning is the same as the monitoring modules EDC1, EDC2 depicted in FIG. 5. The bits 0 through 15 of the read-out data pattern are received at the data input D3 of the third monitor module EDC3 and the bits of the read-out monitoring pattern are received at its remaining inputs. The bits 16 through 31 of the read-out data pattern are received at the data input D4 of the fourth monitor module EDC4 and either all zeros or all ones, corresponding to the logical status "0" or "1" of the control signal IC, are received at the remaining inputs thereof. The outputs of the third monitor module EDC3 and of the fourth monitor module EDC4 are combined with one another by EXOR formation, as a result whereof the syndrome pattern SM derives from the comparison of the read-out monitoring pattern and the monitoring pattern that is formed anew that, first, is received by the syndrome decoder Dec and, second, is received by the syndrome recoder Cod.

In order to illustrate the above description, various examples of the occurrence of bit errors and their handling in accordance with the present invention shall be set forth below with reference to FIGS. 7 through 13.

The examples show the three successive test patterns TM of a test as well as the appertaining input syndrome patterns SMe, whereby the test patterns are each respectively composed of a data pattern DM and of a monitoring pattern KM. The test patterns are thereby written into the smallest addressable unit (TMwr) and are again read out (TMrd) in the following test cycle. The representation of the data patterns is hexadecimal for shorter notation. The monitoring pattern, that is formed anew, is respectively shown in the examples below the read-out monitoring pattern or, respectively, next to the input syndrome pattern SMe.

Example 1 in FIG. 7 shows the test sequence for a specific, smallest addressable unit where no bit error was found. As depicted, all bit positions of the appertaining, smallest addressable unit are checked in both polarities with the read-out and checking of the second test pattern for bit errors.

Since the renewed formation of the monitoring pattern KM in the second means V2 fundamentally occurs according to the code of FIG. 1, the monitoring pattern formed anew for checking the read-out, second test pattern must be additionally inverted in the third test cycle, which, as already mentioned, is effected via the control signal IC.

Example 2 in FIG. 8 shows the test execution with a single error at bit position 17 in the data pattern of the first test pattern. The appertaining bit position is underlined for identification. As depicted, the monitoring pattern of the second test pattern is completely inverted with regards to the monitoring pattern of the third test pattern. This is based on the "active" control signal IG (see FIG. 2) in the second test pattern.

Example 3 in FIG. 9 shows the test execution with a single error in the data pattern of the second test pattern. As depicted, this bit error is effective only at its appearance in the second test pattern, since the effectiveness of this bit error that is identified by the syndrome pattern is again lost due to its repeated appearance.

Example 4 in FIG. 10 shows the test execution with a single error in the data pattern of the first test pattern and a single error in the monitoring pattern of the third test pattern. As depicted, an even-numbered syndrome pattern that leads to the signalling of a multiple error derives after the read-out of the third test pattern.

Example 5 in FIG. 11 shows the test execution for a single error in the monitoring pattern of the first test pattern. In order to guarantee the inventive transfer of the syndrome pattern of a single error into the next cycle even for single errors in the monitoring pattern, a recoding of such a syndrome pattern having three ones (odd-numbered multiple error) occurs, this then being utilized for the modification of the monitoring pattern to be newly written in. A further problem is that, in addition to the transfer of this single error in the monitoring pattern, it must also be guaranteed that the remaining monitoring bits are inversely checked. For resolving this problem, it is necessary to convert the syndrome pattern having three ones that arises in the transfer of a single error into a syndrome pattern that contains five ones in the next test pattern, in case no further bit error occurs. This likewise occurs using the recoder according to the table in FIG. 4. Also, in the read-out of this syndrome pattern the signalling of defined, odd-numbered multiple errors is suppressed using the control signal U. The said conversion of the syndrome pattern of a single error in the monitoring pattern into an odd-numbered multiple error (syndrome pattern having three or, respectively, five ones) occurs because the odd-numbered syndrome pattern always becomes an even-numbered syndrome pattern given the occurrence of a further single error (in the monitoring pattern or data pattern). This even-numbered syndrome pattern always leads to a signalling of a multiple error.

The inventive recording of the syndrome pattern also assures that an incorrectly read-out bit position of the monitoring pattern is retained upon write-in of the following test pattern. This is important in case of a sporadically occurring single error in the monitoring pattern since this would otherwise lead to an identification of a multiple error.

Example 6 in FIG. 12 shows the test execution with a single error in the monitoring pattern of the second test pattern.

Example 7 in FIG. 13 shows the test execution for a single error in the data pattern of the first test pattern as well as for a single error in the monitoring pattern of the second test pattern, whereby a monitoring bit position is affected for the single error in the monitoring pattern. This is not inverted by comparison to the monitoring bit position because of the inventive transfer of the single error in the first pattern.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for testing a smallest addressable unit of a storage medium of a RAM memory system for determination of a number of bit errors lying above a defined order, comprising the steps of:
   (a) writing a first test pattern into the smallest addressable unit of the storage medium, said test pattern being composed of a data pattern and of a monitoring pattern, the monitoring pattern being formed from the data pattern according to a defined algebraic rule;
   (b) reading out in turn the first test pattern, and forming a further monitoring pattern from the read-out data pattern according to the same algebraic rule;
   (c) comparing the further monitoring pattern to the read-out monitoring pattern, so that whether a number of bit errors has occurred and whether the number lies above the defined order is recognized; and
   (d) repeating method steps (a) through (c) using instead a second test pattern that, given the prior absences of a bit error, is completely inverted compared to the first test pattern, and given the prior occurrence of a number of bit errors lying below a defined order, the inversion of the monitoring pattern is modified such that the effect of the error(s) of said number remains given the repeated implementation of method steps (a) through (c) and a combination of bit errors is thus recognized in method step (c) that is derived through the addition of bit errors that separately occurred in the first and second test pattern.

2. The method according to claim 1, wherein a memory word situated in the respective smallest addressable unit of the storage medium at the beginning of the test is used as the first test pattern, and wherein method step (a) for the first test pattern is already considered executed.

3. The method according to claim 1, wherein the same, permanently prescribed bit pattern is used as the first test pattern for every smallest addressable unit of the storage medium.

4. The method according to claim 3, wherein method steps (a) through (c) are repeated using instead a third test pattern that is inverted compared to the second test pattern at least for those monitoring bit positions that had been modified in the second test pattern.

5. The method according to claim 3, wherein different first test patterns are used for successive tests.

6. The method according to claim 3, wherein the comparison of the further monitoring pattern to the read-out monitoring pattern according to method step (c) occurs by XOR formation over the individual bit positions corresponding to one another; and the modification of the monitoring pattern with reference to a syndrome pattern derived from the comparison occurs by inverting the bits of the monitoring pattern at the positions at which the bits of the syndrome pattern have a logical 1.

7. The method according to claim 6, wherein the syndrome pattern of a single error in the monitoring pattern is recoded into a syndrome pattern of a defined bit error in the data pattern before it is utilized for modifying the monitoring pattern of the following test pattern.

8. A circuit arrangement, for testing a smallest addressable unit of a storage medium of a RAM memory system for determination of a number of bit errors lying above a defined order, comprising: first means for generating and modifying a monitoring pattern that, together with a data pattern, is written into the smallest addressable unit of the memory module as a test pattern; second means for accepting a read-out test pattern, forming a further monitoring pattern from the data pattern according to a defined algebraic rule, and for generating by XOR formation of the further monitoring pattern with the read-out monitoring pattern a syndrome pattern that is supplied to the first means for modifying the bits of the monitoring pattern for the next test pattern; decoder means for decoding the syndrome pattern and for subsequent signalling of a number of bit errors lying above the defined order; third means for controlling an operating mode of the first and second means, as well as of the decoder means.

9. The circuit arrangement according to claim 8, wherein the circuit arrangement further comprises a syndrome recoder means with which the syndrome pattern is recoded for modifying the monitoring pattern, such that a syndrome pattern of a single error in the monitoring pattern is recoded into a syndrome pattern of a defined bit error in the data pattern before it is utilized for modifying the monitoring pattern of a following test pattern before it is supplied to the first means.

10. A method for testing a smallest addressable unit of a storage medium of a RAM memory system for determination of a number of bit errors lying above a defined order, comprising the steps of:

(a) writing a first test pattern into the smallest addressable unit of the storage medium, said test pattern being composed of a data pattern and of a monitoring pattern, the monitoring pattern being formed from the data pattern according to a defined algebraic rule;

(b) reading out in turn the first test pattern, and forming a further monitoring pattern from the read-out data pattern according to the same algebraic rule;

(c) comparing the further monitoring pattern to the read-out monitoring pattern, so that whether a number of bit errors has occurred and whether the number lies above the defined order is recognized;

(d) repeating method (a) through (c) using instead a second test pattern that, given the prior absences of a bit error, is completely inverted compared to the first test pattern or, respectively, given the prior occurrence of a number of bit errors lying below a defined error, the inversion of the monitoring pattern is modified such that the effect of the error(s) of said number remains in effect given the repeated implementation of method steps (a) through (c) and a combinations of bit errors is thus recognized in method step (c) that is derived through the addition of bit errors that separately occurred in the first and second test pattern; and (e) repeating method steps (a) through (c) using instead a third test pattern that is inverted compared to the second test pattern at least for those monitoring bit positions that had been modified in the second test pattern.

11. The method according to claim 10, wherein the same, permanently prescribed bit pattern is used as the first test pattern for every smallest addressable unit of the storage medium.

12. The method according to claim 10, wherein a memory word situated in the respective smallest addressable unit of the storage medium at the beginning of the test is used as the first test pattern, wherein method step (a) for the first test pattern is already considered executed.

13. The method according to claim 10, wherein different first test patterns are used for successive tests.

14. The method according to claim 10, wherein the comparison of the further monitoring pattern to the read-out monitoring pattern according to method step (c) occurs by XOR formation over the individual bit positions corresponding to one another; and the modification of the monitoring pattern with reference to a syndrome pattern derived from the comparison occurs by inverting the bits of the monitoring pattern at the positions at which the bits of the syndrome pattern have a logical 1.

15. The method according to claim 14, wherein the syndrome pattern of single error in the monitoring pattern is recoded into a syndrome pattern of a defined bit error in the data pattern before it is utilized for modifying the monitoring pattern of the following test pattern.

* * * * *